United States Patent [19]
Parrish

[11] Patent Number: 5,902,434
[45] Date of Patent: May 11, 1999

[54] METHOD FOR BONDING A COVER MATERIAL TO A FOAM CUSHION

[75] Inventor: Kenneth R. Parrish, Detroit, Mich.

[73] Assignee: Lear Corporation, Southfield, Mich.

[21] Appl. No.: 08/594,894

[22] Filed: Mar. 25, 1996

[51] Int. Cl.[6] .......................... B32B 31/04; B32B 31/12; B32B 31/20; C09J 5/00
[52] U.S. Cl. .......................... 156/214; 156/212; 156/285; 156/311; 156/322; 156/497; 156/498; 156/499
[58] Field of Search .................. 156/214, 212, 156/497, 498, 285, 196, 311, 322, 499

[56] References Cited

U.S. PATENT DOCUMENTS

| | | |
|---|---|---|
| 3,325,329 | 6/1967 | Bolesky . |
| 3,627,608 | 12/1971 | Steiner et al. . |
| 4,692,199 | 9/1987 | Kozlowski et al. . |
| 4,737,226 | 4/1988 | Inoue . |
| 4,786,351 | 11/1988 | Elliott et al. . |
| 4,844,761 | 7/1989 | Bracesco . |
| 4,929,304 | 5/1990 | Urai et al. ........... 156/499 X |
| 5,232,543 | 8/1993 | Frelich et al. . |
| 5,254,197 | 10/1993 | Klems . |
| 5,372,668 | 12/1994 | Bracesco ............. 156/214 |
| 5,407,510 | 4/1995 | Marfilius et al. . |
| 5,486,252 | 1/1996 | Wong . |
| 5,643,385 | 7/1997 | Kikuchi et al. ..... 156/322 X |

FOREIGN PATENT DOCUMENTS

| | | | |
|---|---|---|---|
| 4-359979 | 12/1992 | Japan | 156/497 |
| 5-111962 | 5/1993 | Japan | 156/497 |
| 5-318598 | 12/1993 | Japan | 156/212 |

Primary Examiner—Adrienne C. Johnstone
Attorney, Agent, or Firm—MacMillan, Sobanski & Todd, LLC

[57] ABSTRACT

A method and apparatus for bonding a cover (22) over the undulating surface of a foam cushion (10) includes placing the foam cushion (10) on a tool (18), piercing the cushion (10) with a plurality of needles (44), lifting the needles (44) to lift the cushion (10) as the cushion is frictionally retained on the needles (44), heating ambient air and ejecting the hot air from the needles (44) and into the cushion to elevate the temperature of the cushion. A compression plate (58) with holes (60) extending therethrough is disposed against the backside of the cushion (10) with the needles (44) extending through the holes (60). The needles (44) with the cushion (10) thereon are lowered to place the undulating surface of the cushion against an adhesive film (82) on the backside of the cover (22) so that heat is transferred from the cushion (10) to melt the adhesive. The needles (44) are extracted from the cushion (10) as the compression plate (58) is held against the backside of the cushion to hold the cushion (10) against the cover (22) and the tool (18) and immediately thereafter cool air is ejected from passages (68) in the compression plate (58) and into the cushion (10) to cure the adhesive and bond the cover (22) to the cushion (10).

10 Claims, 5 Drawing Sheets

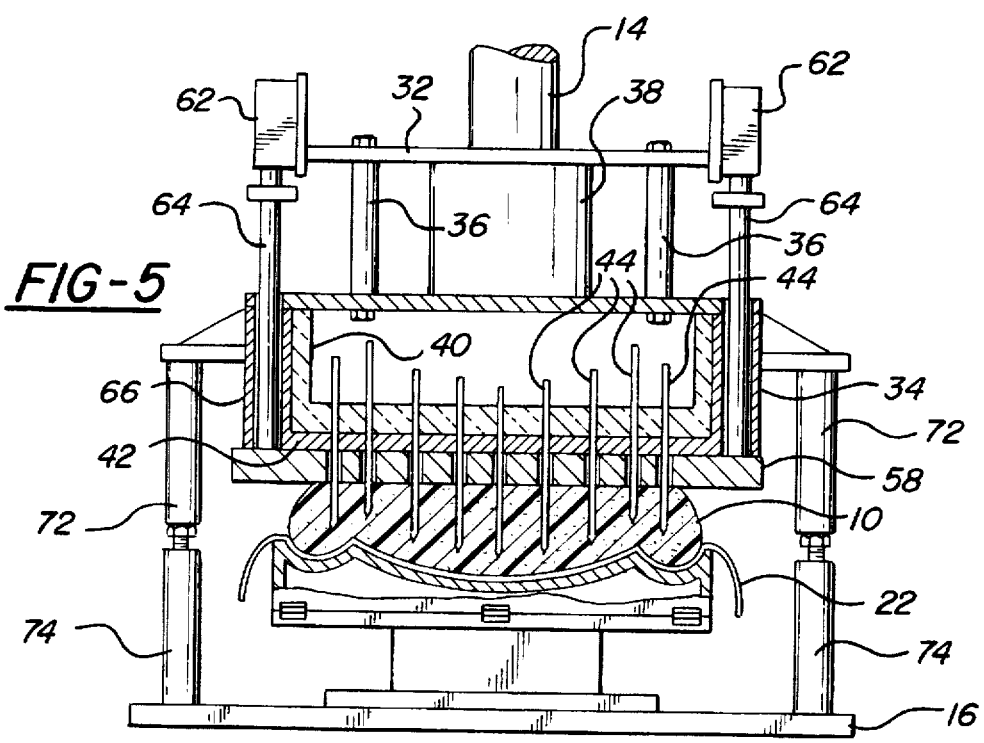
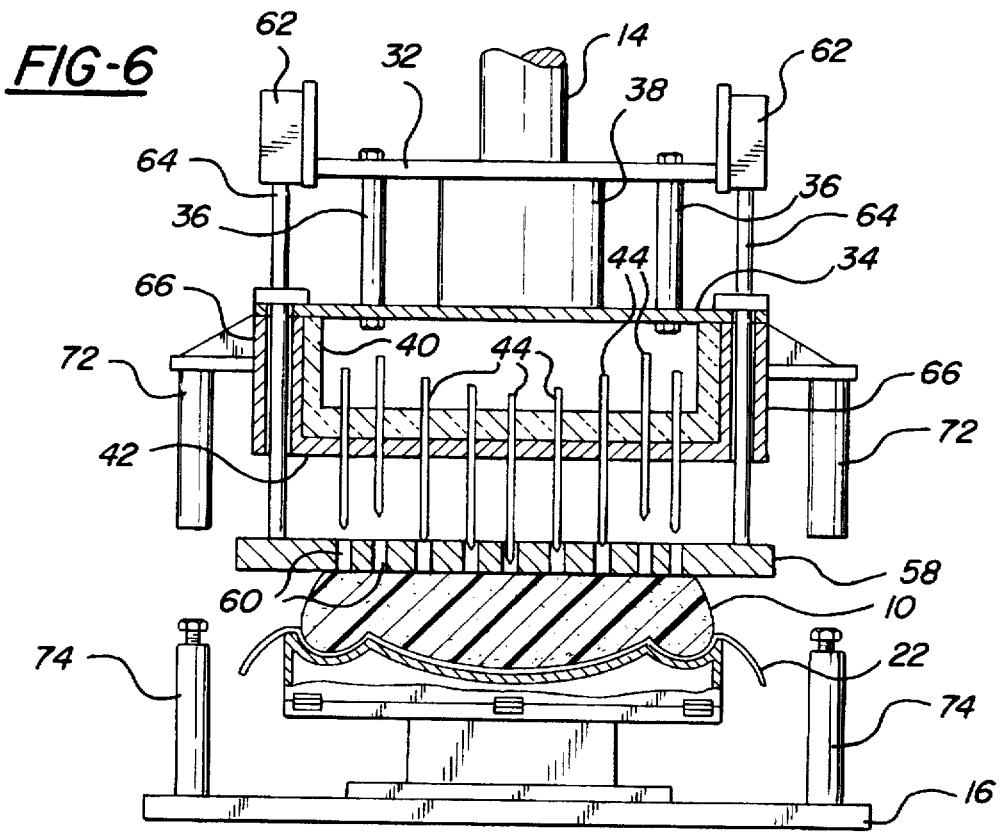

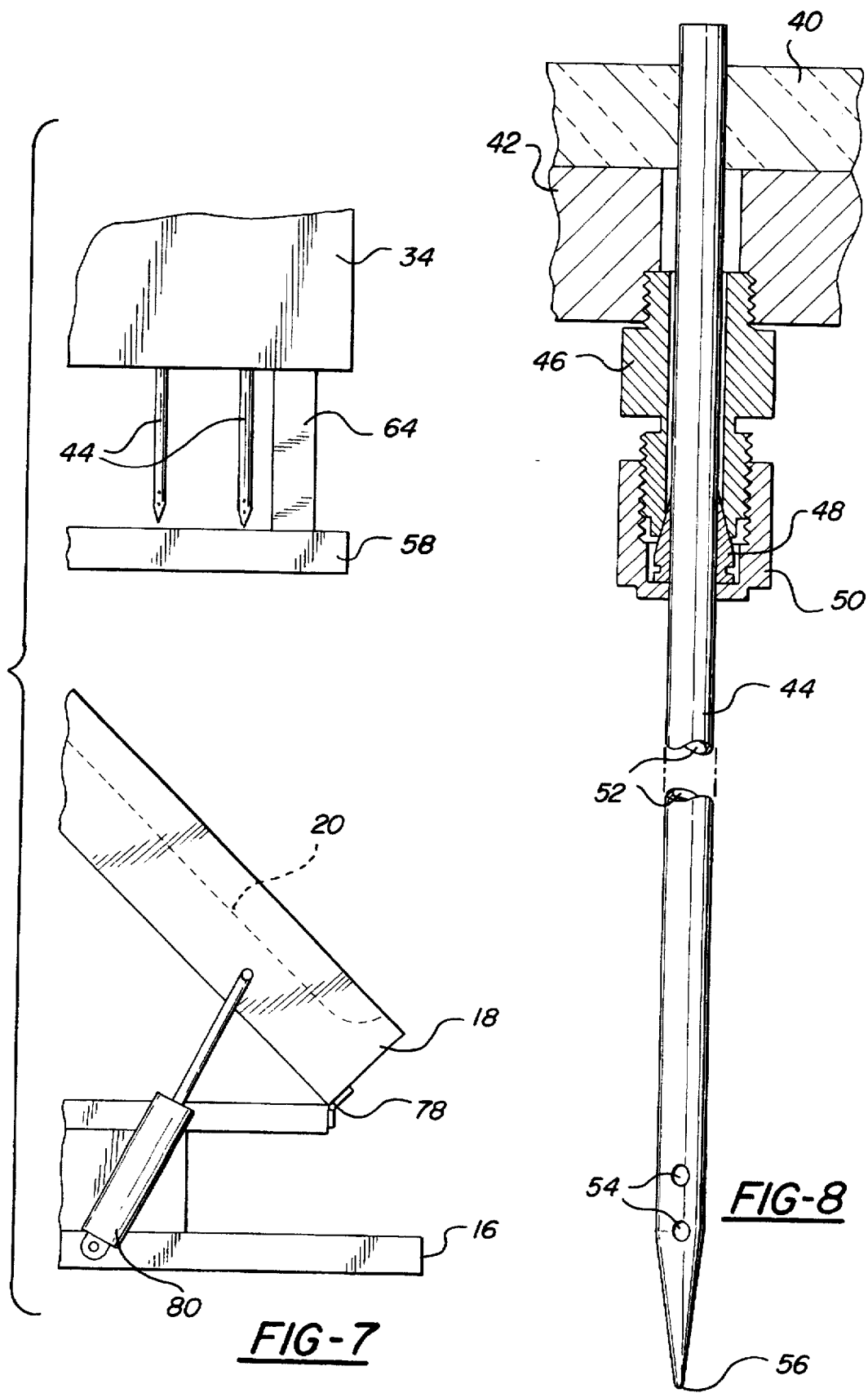

METHOD FOR BONDING A COVER MATERIAL TO A FOAM CUSHION

TECHNICAL FIELD

The subject invention relates to the bonding of a cover to a cellular foam cushion or pad of the type utilized in automotive seats, armrests, and the like.

BACKGROUND OF THE INVENTION

A great deal of development activity has been expended to eliminate the labor intensive cut and sew methods of covering a foam cushion such as seat cushions in automotive seats. A particular segment of this development revolves around the bonding of the cover to the foam cushion.

One such method is disclosed in U.S. Pat. No. 4,692,199 to Kozlowski et al and assigned to the assignee of the subject invention. In accordance with the method disclosed therein, a vacuum is applied to the surface of a contoured tool or mold for drawing an impervious adhesive film against a cloth fabric layer to conform the cloth fabric layer to the contours of the tool surface. A foam cushion having a surface complementary to the tool is placed into mating engagement with the adhesive film as the film is held to the contour of the tool by the vacuum through the cloth layer. The foam cushion is held against the adhesive film, cloth layer and tool by a perforated platen and the vacuum is discontinued. Steam is then supplied through the tool to heat and melt the adhesive film for bonding the cloth layer to the foam cushion. A vacuum is then applied through the tool for removing moisture and curing the adhesive.

A modification of the above method is disclosed in U.S. Pat. No. 5,372,668 to Bracesco wherein "the steam injection apparatus is associated with the upper mold rather than with the lower mold. . . . The upper mold is preferably provided with a plurality of cannulae which are able to pierce the foamed material constituting the padding body so as to provide a gripping action on the latter as well as the following injection of steam adjacent to the fabric." the lower mold or tool "has a greatly simplified structure" and merely applies a vacuum over the tool surface for drawing the cloth against the tool surface.

Although the known methods and apparatus are excellent for bonding a wide variety of cover materials to a foam cushion, there remain cover materials which can not be satisfactorily bonded to the foam cushion because their composition can not withstand the high temperatures and/or the moisture associated with these prior methods without unacceptable degradation.

SUMMARY OF THE INVENTION AND ADVANTAGES

The invention includes an improved assembly for bonding a cover of material over the surface of a foam cushion with an adhesive. The assembly comprises a support structure supporting a tool which presents a working surface for receiving the finished side of the cover and an array of needles supported by the support structure for piercing the cushion. The assembly is characterized by a compression plate having holes extending therethrough with the needles extending through the holes and a mounting mechanism for allowing movement of the compression plate relative to the needles to hold the cushion against the cover and the tool as the needles are extracted from the cushion.

The invention also includes a method of bonding a cover layer of material over the surface of a foam cushion by spreading the finished side of the cover over a working surface of a tool, placing an adhesive between the backside of the cover and the surface of the cushion to be covered and melting the adhesive with heat. The method is characterized by preheating the cushion to elevate the temperature of the cushion and thereafter moving the surface of the heated cushion to be covered against the adhesive and the backside of the cover to melt the adhesive with the transfer of heat from the heated cushion.

Accordingly, the subject invention provides a method and apparatus for bonding covers made of various materials which can not withstand the high temperatures or moisture of steam. A foam cushion may be pierced and supported on the needles of the assembly of the subject invention and heated before being placed against the adhesive to transfer heat thereto with the compression plate retaining the hot cushion against the tool as the needles are extracted. In other words, the cushion may be preheated while retained on the needles and spaced from the tool and thereafter pressed against the tool to relatively quickly melt the adhesive with only a tolerable amount of heat being transferred to the cover material. In order to avoid mositure, heated gases such as hot dry air may be utilized to heat the cushion.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a similar view but showing the heated cushion against the cover with the adhesive having been melted and diffused thereinto;

FIG. 6 is a similar view but showing the needles extracted from the cushion as the cushion is held to the tool by the compression plate;

FIG. 7 is a fragmentary side elevational view showing the tool in a raised position for loading the cover and adhesive layers; and FIG. 8 is an enlarged view of a needle assembly utilized in the subject invention.

DETAILED DESCRIPTION OF THE PREFERRED EMBODIMENT

Figure 1:
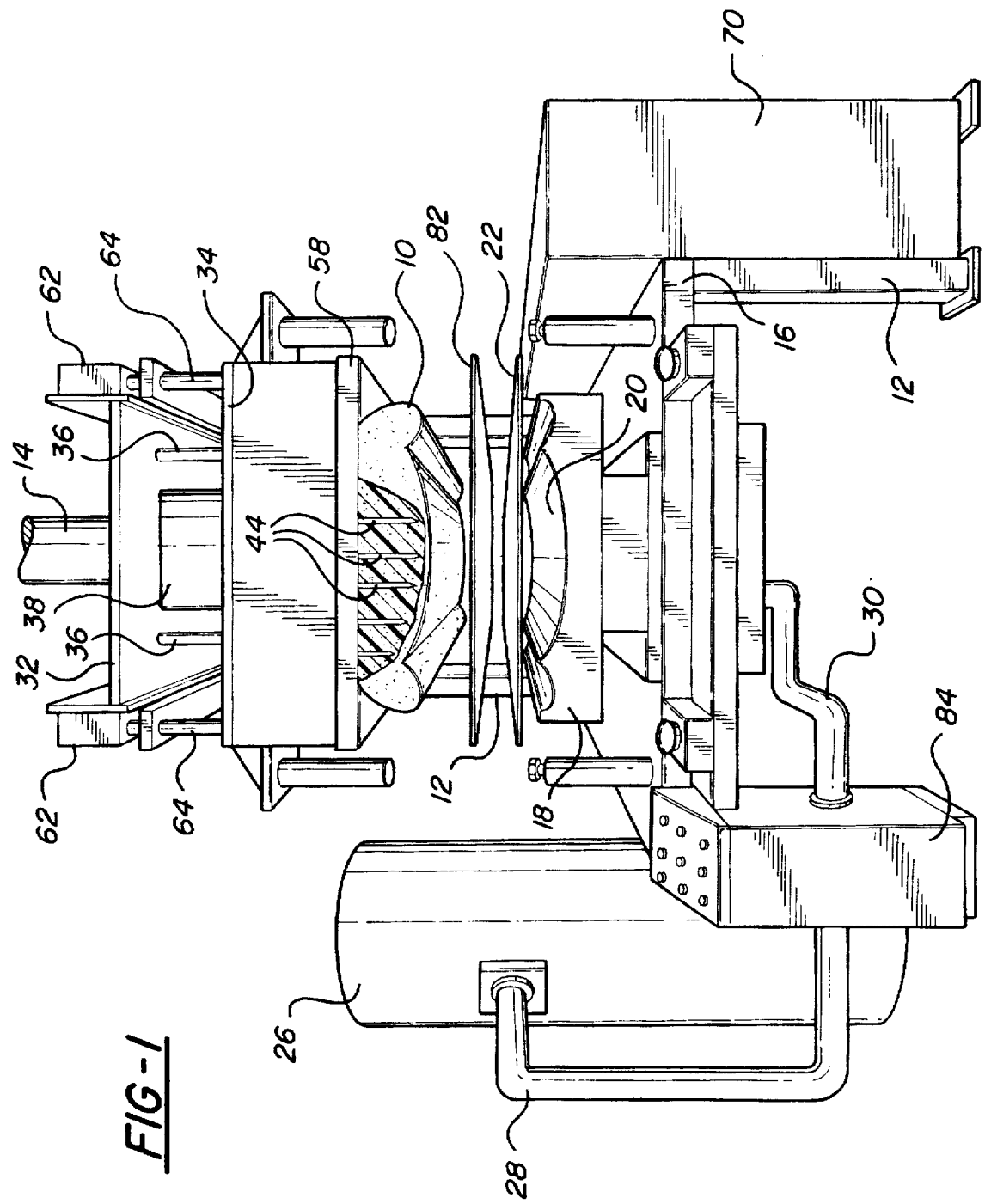
FIG. 1 is a perspective view of an embodiment of an assembly constructed in accordance with the subject invention and showing a foam cushion retained on the needles in spaced relationship to the tool and the film of adhesive and layer of cover in exploded relationship.

Referring to the Figures, wherein like numerals reference like or corresponding parts throughout the several views, an assembly for bonding a cover of material over the surface of a foam cushion 10 with an adhesive is generally shown in FIG. 1. The assembly includes support structure 12 for supporting a ram 14 and a base 16 of a press.

A tool 18 is supported by the base 16 of the support structure 12 and presents a working surface 20 for receiving the finished side of a cover 22. The upper working surface 20 of the tool or mold 18 includes passages or apertures for establishing fluid communication with the working surface 20. The tool 18 defines a chamber 24 which is in fluid communication with a vacuum source 26 through lines 28 and 30. The tool 18 may also comprise a porous material through which fluids will flow.

The ram 14 is moved vertically by a pneumatic cylinder, or the like, to vertically position a horizontal plate 32. A plenum chamber 34 is secured to the support plate 32 by tie rods 36 so that the plenum chamber 34 is in fixed relationship to the support plate 32. A heater 38 is disposed between the top of the plenum 34 and the plate 32 for heating ambient or surrounding air and supplying the hot air to the plenum 34. An insulating material 40 lines the interior walls of the plenum 34 to retain heat energy within the plenum 34, to minimize the transfer of heat energy to the surrounding environment.

The plenum 34 has a bottom wall 42 and an array of needles 44 extend through and are supported by the bottom wall 42. The array of needles 44 are, therefore, supported by the support structure 12 via the plenum 34, the tie rods 36, the support plate 12 and the ram 14. As shown in FIG. 8, each needle 44 is adjustably supported through the bottom wall 42 by a coupling assembly which includes a fitting 46 threaded into a hole through the bottom wall with a conical collar 48 forced into radial gripping engagement with the needle body by a complementary tightening nut 50. The fitting 46, collar 48 and nut 50 comprise adjustment means for adjusting the distance each needle 44 extends from the bottom wall 42 of the plenum 34. Each of the needles 44 has a bore 52 therein for conveying heated fluid from the plenum 34 to ejection ports 54 in the needles for heating the interior of the cushion 10. Each needle 44 also terminates in a lower pointed end 56 for piercing the cushion 10. The working surface 20 of the tool undulates to complement the contour of a seat cushion 10. Accordingly, the needles 44 extend various different distances from the bottom wall 42 whereby the pointed bottom ends 56 of the needles 44 are spaced substantially equal distances from the working surface of the tool 18. All of the bores 52 in the needles 44 are of equal dimension and of equal length to equalize the various mass flow rates through all of the needles 44. In order to accomplish this feature, the needles 44 likewise extend into the plenum 34 various different distances. In this manner, equal amounts of heat are ejected from all of the needles whereby the area of cushion 10 surrounding each needle 44 is heated at the same rate and to the same degree as the areas surrounding all other needles 44.

The assembly 10 is characterized by a compression plate 58 having holes or apertures 60 extending therethrough with the needles 44 extending through the holes 60. A mounting mechanism comprising a pair of actuator cylinders 62 allow movement of the compression plate 58 relative to the needles 44 to hold the cushion 10 against the cover 22 and the tool 18 as the needles 44 are extracted from the cushion 10, as best illustrated in FIG. 6. Each actuator 62 is attached to the support plate 32 of the ram 14 with a rod 64 extending downwardly through guides 66 in the corners of the rectangular plenum 34 to support the compression plate 58 under the bottom wall 42 for vertical movement relative to the bottom wall 42 of the plenum 34.

Figure 2:
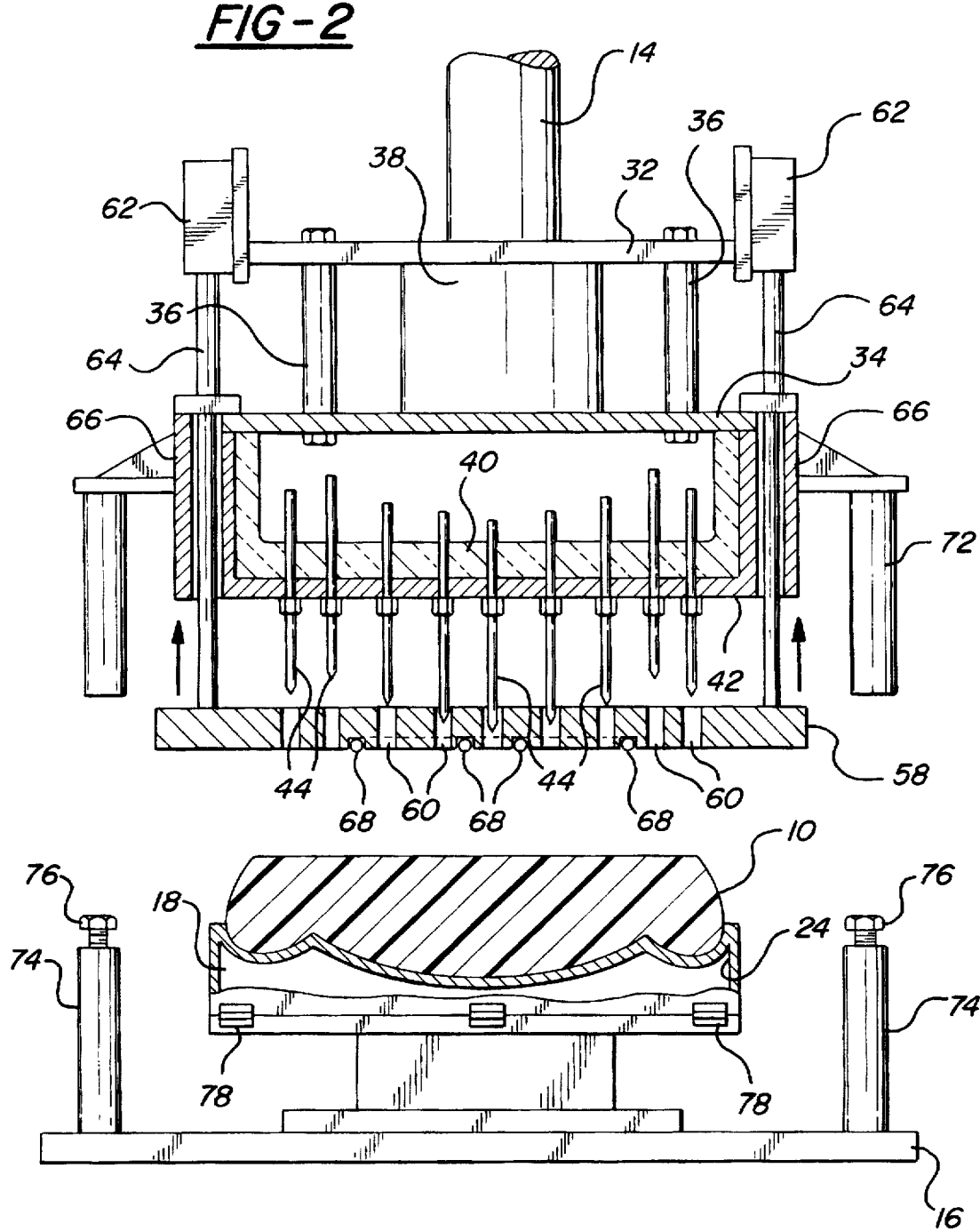
FIG. 2 is an elevational view partially in cross section showing a foam cushion on the tool and ready to be picked up by the needles.

As shown in FIG. 2, the compression plate 58 includes tubes 68 defining passages for ejecting cool fluid into the backside of the cushion 10. An ambient air cooler 70 (shown in FIG. 1) is in fluid communication with the passages 68 for supplying cool air to the passages in the compression plate 58. The air cooler 70 cools ambient or the surrounding air to supply relatively cold air to the compression plate 58.

A plurality of upper stops 72 depend from the ram 14 through the plenum 34 and are aligned with lower stops 74 which extend upwardly from the base 16 for limiting downward movement of the ram 14 to prevent the needles 44 from engaging the tool 18. Adjusting screws 76 adjust the stop position.

A tool support is included for moving the tool 18 back and forth between a working position beneath the needles, shown in FIGS. 1 through 6, and a loading position with the working surface thereof facing generally forwardly, as shown in FIG. 7. The tool support comprises a plurality of hinges 78 interconnecting the tool 18 and the base 16 and an actuator 80 for tilting the tool 18 upwardly to the inclined and forwardly facing position shown in FIG. 7.

A cover layer of material 22 is bonded over the undulating surface of a foam cushion 10 in accordance with a method comprising a varying sequence of the steps, i.e., the steps may be sequential, simultaneous, or varying in order. For example, the method illustrated in FIG. 2 includes the step of placing the foam cushion 10 having an undulating surface on the tool 18 having a working surface 20 conforming to the undulating surface of the cushion 10 to be covered followed by the step illustrated in FIG. 3 of piercing the cushion 10 with the plurality of needles 44 to varying depths in the cushion; however, the cushion 10 may first be placed on a remote loading station (not shown) with the entire upper ram assembly being movable to pick up the cushion at the remote loading station and moving the cushion 10 back to the tool 18 for bonding.

Figure 3:
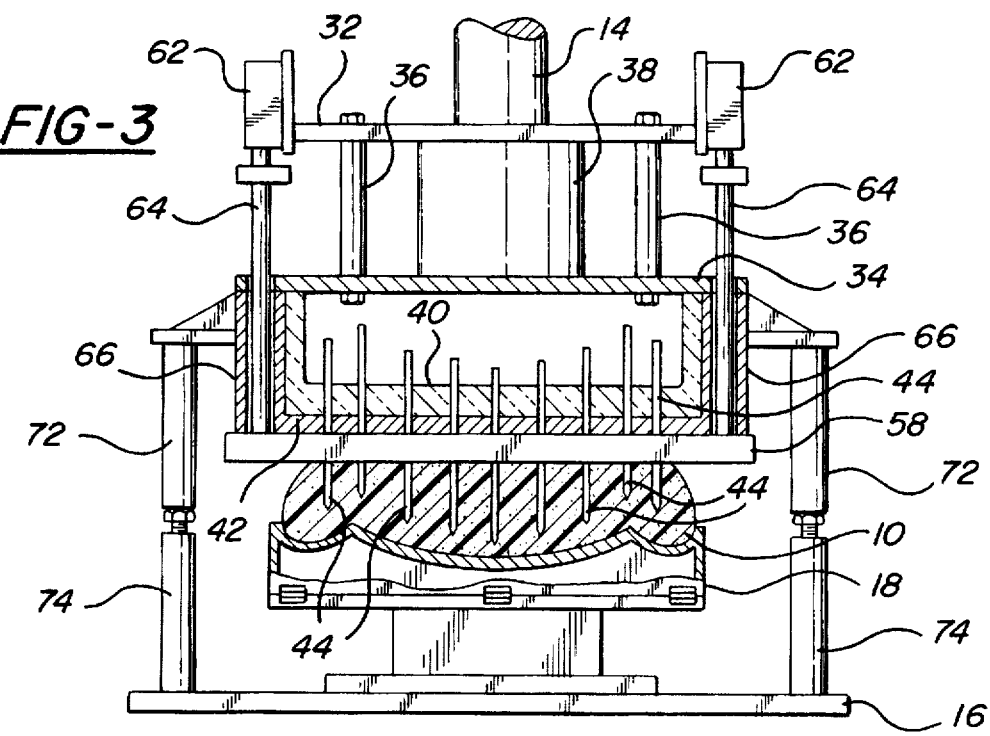
FIG. 3 is a view similar to FIG. 2 but showing the needles piercing the cushion for picking the cushion off the tool.

As shown in FIG. 2, the compression plate 58 is in the lowered position, as at the end of a cycle, but is raised by the actuators 62 to engage or be next adjacent to the bottom wall 42 of the plenum 34 before the cushion 10 is placed upon the tool 18. The ram 14 is sequenced to lower the plenum 34 and the needles 44 so that the needles pierce the cushion 10, as shown in FIG. 3, i.e., disposing the compression plate 58 with holes 60 extending therethrough on the backside of the cushion 10 with the needles 44 extending through the holes 60. Thereafter the ram 14 lifts the plenum 34 and needles 44 to perform the step of lifting the needles 44 to lift the cushion 10 from the tool 18 as the cushion 10 is frictionally retained on the needles 44.

The heater 38 performs the steps of heating ambient air, i.e., the air surrounding the assembly, to hot air to a temperature approximately 150° to 160° F. and above the temperature of the cushion and supplying that hot air to the needles 44. The method includes the step of ejecting the hot air from the needles 44 and into the cushion 10 to elevate the temperature of the cushion 10, while maintaining a substantially equal mass flow rate of hot air through each of the needles 44. Again, theses steps may be performed remotely from the tool 18 as the tool 18 is being loaded with the cover and adhesive.

The tool 18 is loaded with the cover and adhesive by first moving or pivoting the tool 18 from a horizontal working position beneath the needles 44 to a loading position, as shown in FIG. 7, with the working surface 20 thereof facing generally forwardly. In this forwardly inclined position, the tool 18 is out from under the needles 44 and more accessible to the operator for loading. While in this loading position, the operator performs the step of spreading the cover 22 over the working surface 20 of the tool 18 with the finished side of the cover 22 spread over the working surface 20 of the tool 18. The finished side of the cover is that side which will end up being the side presented to the vehicle interior, in the case of leather, it would be the treated and smooth side, in the case of velvet, it would be the felt side. The cover is an automotive grade fabric such as that available from Milliken™ or it may be laminated with a thin layer of foam such as that available from Foamex™.

The loading step further includes placing an adhesive 82 over the backside of the cover 22. As illustrated in FIGS. 1 and 2, the adhesive comprises a thin film which is impervious to air. Preferably, the film is clear so that the operator can see through the film to remove wrinkles in the cover layer 22. Alternatively, the adhesive may comprise a paste which is spread over the backside of the cover 22. The adhesive is reactive at low temperature recited above to cross-link or react and is available from Worthen Industries™ and may be available in the future from Bostik™. In any case the method continues by applying a vacuum pressure over the working surface 20 of the tool 18 to draw the cover 22 against the working surface 20 of the tool 18. The vacuum is created by the vacuum source 26 and is communicated through the fluid lines 28 and 30 to a plenum below the tool 18 and to the interior chamber 24 of the tool 18. The vacuum is applied over the working surface 20 of the tool 18 through passages or apertures in the top wall of the tool 18, or through pores in the tool 18 in the case of a porous tool 18. In the situation where the cover 22 is permeable to air flow the adhesive 82 is an air impervious film to react with the vacuum applied thereto to pull the cover 22 down against the working surface 20 of the tool 18. In the situation where the cover 22 is impervious to air, as in the case of leather, the adhesive may be a paste or the equivalent as the vacuum reacts directly with the impervious cover 22. In either case, the cover 22 is made smooth and free of wrinkles over the working surface 20 of the tool 18 by the operator while under the influence of the vacuum.

Figure 4:
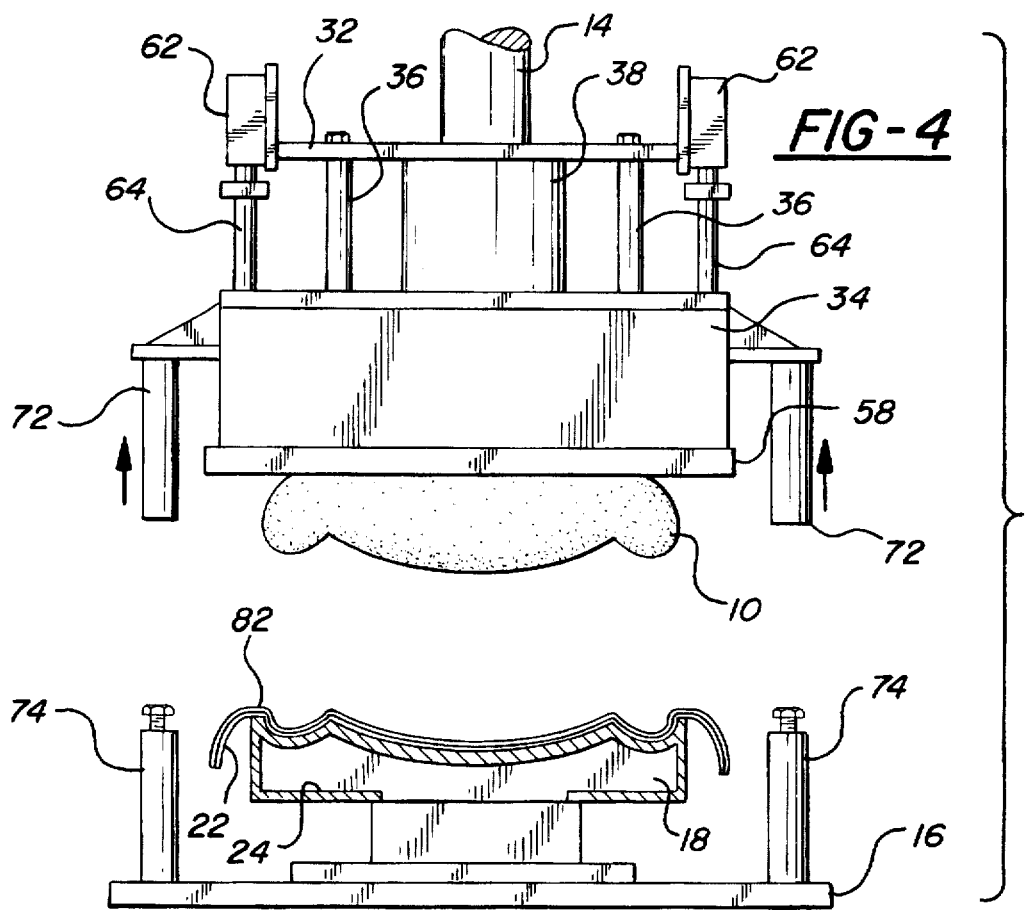
FIG. 4 is a similar view but showing the cushion suspended in space above the tool and the tool loaded with a layer of cover material and a layer of adhesive.

Once the tool 18 is loaded with the cover 22 and adhesive 82, the process continues by lowering the tool 18 to the working position, as shown in FIG. 4. The tool 18 is raised and lowered by actuation of the actuator 80 shown in FIG. 7.

The method is characterized by preheating the cushion 10 to elevate the temperature of the cushion 10 and thereafter moving the surface of the heated cushion 10 to be covered against the adhesive 82 and the backside of the cover 22 to melt the adhesive 82 with the transfer of heat from the heated cushion 10. This is accomplished by lowering the needles 44 with the cushion 10 thereon from the position shown in FIG. 4 to the position shown in FIG. 5 to place the undulating surface of the cushion 10 against the adhesive 82 and the backside of the cover 22 this lowering is performed by the ram 14 and the stops 72, 74 and 76 are adjusted for preventing the needles 44 from contacting the tool working surface 20. The hot air has preheated the cushion sufficiently to cause the melting of the adhesive 82 with the transfer of heat from the cushion 10. In fact, the cushion is hot enough relative to the melting point of the adhesive 82 to cause the adhesive 82 to melt in a very short time, that is, a short enough time period to prevent a quantity of heat transfer to the finished side of the cover 22 sufficient to cause degradation of the cover 22.

Relatively quickly, therefore, the ram 14 is actuated to perform the step of extracting the needles 44 from the cushion, the step shown in FIG. 6. During this step the actuators 62 assure the holding of the compression plate 58 against the backside of the cushion 10 to hold the undulating surface of the cushion 10 against the cover 22 and the tool 18 as the needles 44 are extracted. The cooler 70 continually operates for cooling ambient air to provide cool or cold air so that immediately upon the hot needles 44 being extracted from the cushion 10, cold air is ejected from the passages 68 in the compression plate 58 and into the cushion 10 from the backside thereof to cure the adhesive and bond the cover 22 to the cushion 10. Thereafter, the ram 14 is raised back to the position shown in FIG. 1 and the cushion 10 with the cover 22 bonded thereto is removed from the tool 18.

As shown in FIG. 1, the assembly includes a control panel 84 for sequencing the various steps. The control panel 84 may be utilized to manually sequence the steps by manual manipulation to perform each step as by pushing a button to execute the actuation of each of the ram 14, the actuators 62 and 80, heater 38, the vacuum source 26, the cooler 70, etc. Alternatively, the controller may be fully automatic to perform the steps in the desired sequence.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of bonding a cover layer of material over the surface of a foam cushion comprising the steps of:

spreading the finished side of the cover over a working surface of a tool;

placing an adhesive between the backside of the cover and the surface of the cushion to be covered;

piercing the cushion with a plurality of needles;

disposing the cushion to be covered against the adhesive and the backside of the cover;

disposing a compression plate with holes extending therethrough on the backside of the cushion with the needles extending through the holes and holding the compression plate against the backside of the cushion to hold the cushion against the cover and the tool;

injecting heated gases through the needles and into the surrounding cushion to elevate the temperature of the cushion;

melting the adhesive with the transfer of heat from the heated cushion; and curing the adhesive thereby bonding the cover to the cushion.

2. A method as set forth in claim 1 wherein the injecting of heated gases into the cushion is further defined as preheating the cushion to elevate the temperature of the cushion and thereafter moving the surface of the heated cushion to be covered against the adhesive and the backside of the cover.

3. A method as set forth in claim 2 wherein the injecting of gases is further defined as heating ambient air and injecting the hot air into the cushion.

4. A method as set forth in claim 3 wherein the injecting of hot air through the needles is further defined as maintaining a substantially equal mass flow rate of hot air through each of the needles.

5. A method as set forth in claim 3 wherein the preheating and moving of the cushion is further defined as piercing the cushion with the plurality of needles to support and move the cushion.

6. A method as set forth in claim 5 wherein the moving of the cushion is further defined as moving the needles with the heated cushion thereon to place the heated surface of the cushion against the adhesive and the backside of the cover to transfer heat from the cushion to the adhesive.

7. A method as set forth in claim 6 wherein the curing of the adhesive is further defined as supplying cooling fluid through the backside of the cushion.

8. A method as set forth in claim 7 wherein said supplying of cooling fluid is further defined as extracting the needles and thereafter ejecting cool air from the compression plate and into the cushion from the backside thereof.

9. A method of bonding a cover layer of material over the undulating surface of a foam cushion comprising a varying sequence of the following steps:

placing the foam cushion having an undulating surface on a tool having a working surface conforming to the undulating surface of the cushion to be covered;

piercing the cushion with a plurality of needles to varying depths in the cushion;

lifting the needles to lift the cushion as the cushion is frictionally retained on the needles;

heating ambient air to hot air to a temperature above the temperature of the cushion;

supplying the hot air to the needles;

ejecting the hot air from the needles and into the cushion to elevate the temperature of the cushion;

moving the tool from a working position beneath the needles to a loading position with the working surface thereof facing generally forwardly;

spreading the cover over the working surface of the tool with the finished side of the cover facing the working surface of the tool;

placing an adhesive over the backside of the cover;

applying a vacuum pressure over the working surface of the tool to draw the cover against the working surface of the tool;

lowering the tool to the working position;

disposing a compression plate with holes extending therethrough on the backside of the cushion with the needles extending through the holes;

lowering the needles with the cushion thereon to place the undulating surface of the cushion against the adhesive and the backside of the cover;

preventing the needles from contacting the tool surface;

melting the adhesive with the transfer of heat from the cushion;

extracting the needles from the cushion;

holding the compression plate against the backside of the cushion to hold the undulating surface of the cushion against the cover and the tool as the needles are extracted;

cooling ambient air to provide cool air; and ejecting the cool air from the compression plate and into the cushion from the backside thereof to cure the adhesive and bond the cover to the cushion.

10. A method as set forth in claim 9 wherein the ejecting of hot air from the needles is further defined as maintaining a substantially equal mass flow rate of hot air through each of the needles.

\* \* \* \* \*